US010762743B2

(12) United States Patent
Burney et al.

(10) Patent No.: US 10,762,743 B2
(45) Date of Patent: Sep. 1, 2020

(54) TRACKING AND UTILIZING DATA AND INFORMATION ACROSS A PLURALITY OF TECHNOLOGICAL PARADIGMS

(71) Applicant: Bally Gaming, Inc., Las Vegas, NV (US)

(72) Inventors: Joshua K. Burney, Braselton, GA (US); Mark B. Gagner, West Chicago, IL (US); Patrick M. Gustafson, Chicago, IL (US); Gary J. Oswald, Elk Grove Village, IL (US); Amy Reyes, Chicago, IL (US)

(73) Assignee: SG Gaming, Inc., Las Vegas, NV (US)

( * ) Notice: Subject to any disclaimer, the term of this patent is extended or adjusted under 35 U.S.C. 154(b) by 800 days.

(21) Appl. No.: 15/054,857

(22) Filed: Feb. 26, 2016

(65) Prior Publication Data

US 2016/0253868 A1 Sep. 1, 2016

Related U.S. Application Data

(60) Provisional application No. 62/121,297, filed on Feb. 26, 2015.

(51) Int. Cl.
*G06F 17/00* (2019.01)
*G07F 17/32* (2006.01)

(52) U.S. Cl.
CPC ........ *G07F 17/3239* (2013.01); *G07F 17/329* (2013.01); *G07F 17/3225* (2013.01); *G07F 17/3244* (2013.01)

(58) Field of Classification Search
CPC ............... G07F 17/3239; G07F 17/329; G07F 17/3225; G07F 17/3244
See application file for complete search history.

(56) References Cited

U.S. PATENT DOCUMENTS

| | | | |
|---|---|---|---|
| 4,858,930 | A | 8/1989 | Sato |
| 6,967,566 | B2 | 11/2005 | Weston et al. |
| 7,128,652 | B1 | 10/2006 | Lavoie et al. |
| 7,396,281 | B2 | 7/2008 | Mendelsohn et al. |
| 7,425,169 | B2 | 9/2008 | Ganz |

(Continued)

FOREIGN PATENT DOCUMENTS

| | | |
|---|---|---|
| WO | 2005020122 | 3/2005 |
| WO | 2007130464 | 11/2007 |

(Continued)

*Primary Examiner* — Dmitry Suhol
*Assistant Examiner* — Carl V Larsen

(57) ABSTRACT

Embodiments of the inventive subject matter include methods and systems for conducting metagames. A method can include providing a wagering game including a plurality of tasks, the plurality of tasks including a first task, a second task, and a third task, wherein the first task must be performed via a wagering game machine in a land-based casino, wherein the second task must be performed online, and wherein the third task must be performed via a ticket. The method can further include establishing a player account in at least one memory device. The method can further include determining that one or more of the plurality of tasks have been completed by a player associated with the player account. The method can further include in response to the determining, assigning an award to the player account.

14 Claims, 10 Drawing Sheets

(56) References Cited

U.S. PATENT DOCUMENTS

| | | | |
|---|---|---|---|
| 7,442,108 | B2 | 10/2008 | Ganz |
| 7,465,212 | B2 | 12/2008 | Ganz |
| 7,534,157 | B2 | 5/2009 | Ganz |
| 7,568,964 | B2 | 8/2009 | Ganz |
| 7,621,813 | B2 | 11/2009 | Bortnik et al. |
| 7,704,145 | B2 | 4/2010 | Glisson et al. |
| 8,016,668 | B2 | 9/2011 | Hardy et al. |
| 8,029,361 | B2 | 10/2011 | Hardy et al. |
| 8,100,759 | B2 | 1/2012 | Hardy et al. |
| 8,109,828 | B2 | 2/2012 | Kane et al. |
| 8,118,667 | B2 | 2/2012 | Herrmann |
| 8,157,635 | B2 | 4/2012 | Hardy et al. |
| 8,177,634 | B2 | 5/2012 | Herrmann et al. |
| 8,182,346 | B2 | 5/2012 | Herrmann et al. |
| 8,187,087 | B2 | 5/2012 | Herrmann et al. |
| 8,187,088 | B2 | 5/2012 | Anderson et al. |
| 8,187,101 | B2 | 5/2012 | Herrmann et al. |
| 8,192,289 | B2 | 6/2012 | Herrmann et al. |
| 8,232,094 | B2 | 7/2012 | Hasson et al. |
| 8,246,466 | B2 | 8/2012 | Herrmann et al. |
| 8,277,324 | B2 | 10/2012 | Herrmann et al. |
| 8,360,870 | B2 | 1/2013 | Herrmann et al. |
| 8,366,546 | B1 * | 2/2013 | Naik ........................ A63F 13/12 463/31 |
| 8,366,550 | B2 | 2/2013 | Herrmann et al. |
| 8,398,479 | B2 | 3/2013 | Hardy et al. |
| 8,535,149 | B2 * | 9/2013 | Ziegler .................... A63F 13/58 463/16 |
| 8,568,212 | B2 | 10/2013 | Gagner et al. |
| 8,591,311 | B2 | 11/2013 | Englman et al. |
| 8,616,962 | B2 | 12/2013 | Anderson et al. |
| 8,628,422 | B2 | 1/2014 | Allen et al. |
| 8,851,978 | B1 * | 10/2014 | Koh ........................... A63F 9/24 463/23 |
| 9,666,029 | B1 * | 5/2017 | Yu ........................ G07F 17/3255 |
| 2002/0090985 | A1 * | 7/2002 | Tochner .................. A63F 13/12 463/1 |
| 2003/0018523 | A1 | 1/2003 | Rappaport et al. |
| 2003/0083943 | A1 | 5/2003 | Adams et al. |
| 2004/0043806 | A1 | 3/2004 | Kirby et al. |
| 2004/0087373 | A1 | 5/2004 | Choi |
| 2004/0177007 | A1 | 9/2004 | Van Luchene et al. |
| 2004/0204228 | A1 * | 10/2004 | Walker ................ G07F 17/3244 463/20 |
| 2005/0033601 | A1 | 2/2005 | Kirby et al. |
| 2005/0250567 | A1 | 11/2005 | Kane et al. |
| 2005/0287925 | A1 | 12/2005 | Proch et al. |
| 2006/0121991 | A1 | 6/2006 | Borinik et al. |
| 2006/0122716 | A1 | 6/2006 | Bortnik et al. |
| 2006/0172799 | A1 | 8/2006 | Kane et al. |
| 2007/0117629 | A1 | 5/2007 | Fowler et al. |
| 2007/0173327 | A1 | 7/2007 | Kilgore et al. |
| 2007/0254736 | A1 | 11/2007 | Hardy et al. |
| 2007/0265091 | A1 | 11/2007 | Aguilar, Jr. et al. |
| 2008/0059304 | A1 * | 3/2008 | Kimsey ................... A63F 13/12 705/14.12 |
| 2008/0090659 | A1 | 4/2008 | Aguilar et al. |
| 2008/0097839 | A1 * | 4/2008 | Koren .................... G06Q 30/02 705/14.1 |
| 2008/0146322 | A1 | 6/2008 | Hardy et al. |
| 2008/0146323 | A1 | 6/2008 | Hardy et al. |
| 2008/0146345 | A1 | 6/2008 | Hardy et al. |
| 2008/0146346 | A1 | 6/2008 | Hardy et al. |
| 2008/0300049 | A1 | 12/2008 | Anderson et al. |
| 2009/0054148 | A1 | 2/2009 | Hardy et al. |
| 2009/0061980 | A1 | 3/2009 | Holton et al. |
| 2009/0170608 | A1 | 7/2009 | Herrmann et al. |
| 2009/0170610 | A1 | 7/2009 | Herrmann et al. |
| 2009/0170611 | A1 | 7/2009 | Herrmann et al. |
| 2009/0170612 | A1 | 7/2009 | Herrmann et al. |
| 2009/0170613 | A1 | 7/2009 | Herrmann et al. |
| 2009/0170614 | A1 | 7/2009 | Herrmann et al. |
| 2009/0176560 | A1 | 7/2009 | Herrmann et al. |
| 2009/0176564 | A1 | 7/2009 | Herrmann et al. |
| 2009/0176578 | A1 | 7/2009 | Herrmann et al. |
| 2009/0176579 | A1 | 7/2009 | Herrmann et al. |
| 2009/0176580 | A1 | 7/2009 | Herrmann et al. |
| 2009/0191962 | A1 | 7/2009 | Hardy et al. |
| 2010/0016069 | A1 | 1/2010 | Herrmann |
| 2010/0029376 | A1 * | 2/2010 | Hardy ..................... G07F 17/32 463/25 |
| 2010/0029381 | A1 * | 2/2010 | Vancura .............. G07F 17/3244 463/30 |
| 2010/0069148 | A1 | 3/2010 | Cargill |
| 2010/0160035 | A1 | 6/2010 | Herrmann |
| 2010/0274617 | A1 * | 10/2010 | Suomela ........ G06Q 10/063114 705/7.15 |
| 2010/0279764 | A1 | 11/2010 | Allen et al. |
| 2010/0311496 | A1 | 12/2010 | Taylor et al. |
| 2011/0014972 | A1 | 1/2011 | Herrmann et al. |
| 2011/0081958 | A1 | 4/2011 | Herrmann et al. |
| 2011/0092267 | A1 | 4/2011 | Hardy et al. |
| 2011/0111855 | A9 | 5/2011 | Hardy et al. |
| 2011/0201415 | A1 * | 8/2011 | Gagner .................. G06Q 50/34 463/25 |
| 2011/0275438 | A9 | 11/2011 | Hardy et al. |
| 2011/0282728 | A1 | 11/2011 | Bingham et al. |
| 2012/0202577 | A1 | 8/2012 | Kane et al. |
| 2012/0238353 | A1 | 9/2012 | Herrmann et al. |
| 2013/0090750 | A1 | 4/2013 | Herrman et al. |
| 2014/0122198 | A1 * | 5/2014 | Cheung .............. G06Q 30/0211 705/14.13 |
| 2015/0298008 | A1 * | 10/2015 | Broom .................. A63F 13/795 463/25 |

FOREIGN PATENT DOCUMENTS

| | | |
|---|---|---|
| WO | 2008051796 | 5/2008 |
| WO | 2008060978 | 5/2008 |

* cited by examiner

TRACKING AND UTILIZING DATA AND INFORMATION ACROSS A PLURALITY OF TECHNOLOGICAL PARADIGMS

RELATED APPLICATIONS

This application claims the priority benefit of U.S. Provisional Application Ser. No. 62/121,297 filed Feb. 26, 2015.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2015, Bally Gaming, Inc.

FIELD

Embodiments of the inventive subject matter relate generally to wagering game systems, and more particularly to wagering game systems for conducting a metagame across multiple devices.

BACKGROUND

Currently, many different electronic devices exist. For example, many people use personal computers, cellular telephones, and other mobile devices daily. Many of these electronic devices utilize different electronic data systems. Mechanisms have been created which allow the various electronic data systems to work together. For example, mechanisms exist which allow for data-tracking across the various electronic data systems. However, as new electronic data systems are created, there is a need for new technology to enable the electronic data systems to work together.

BRIEF DESCRIPTION OF THE FIGURES

Embodiments of the invention are illustrated in the Figures of the accompanying drawings in which.

Figure 1:
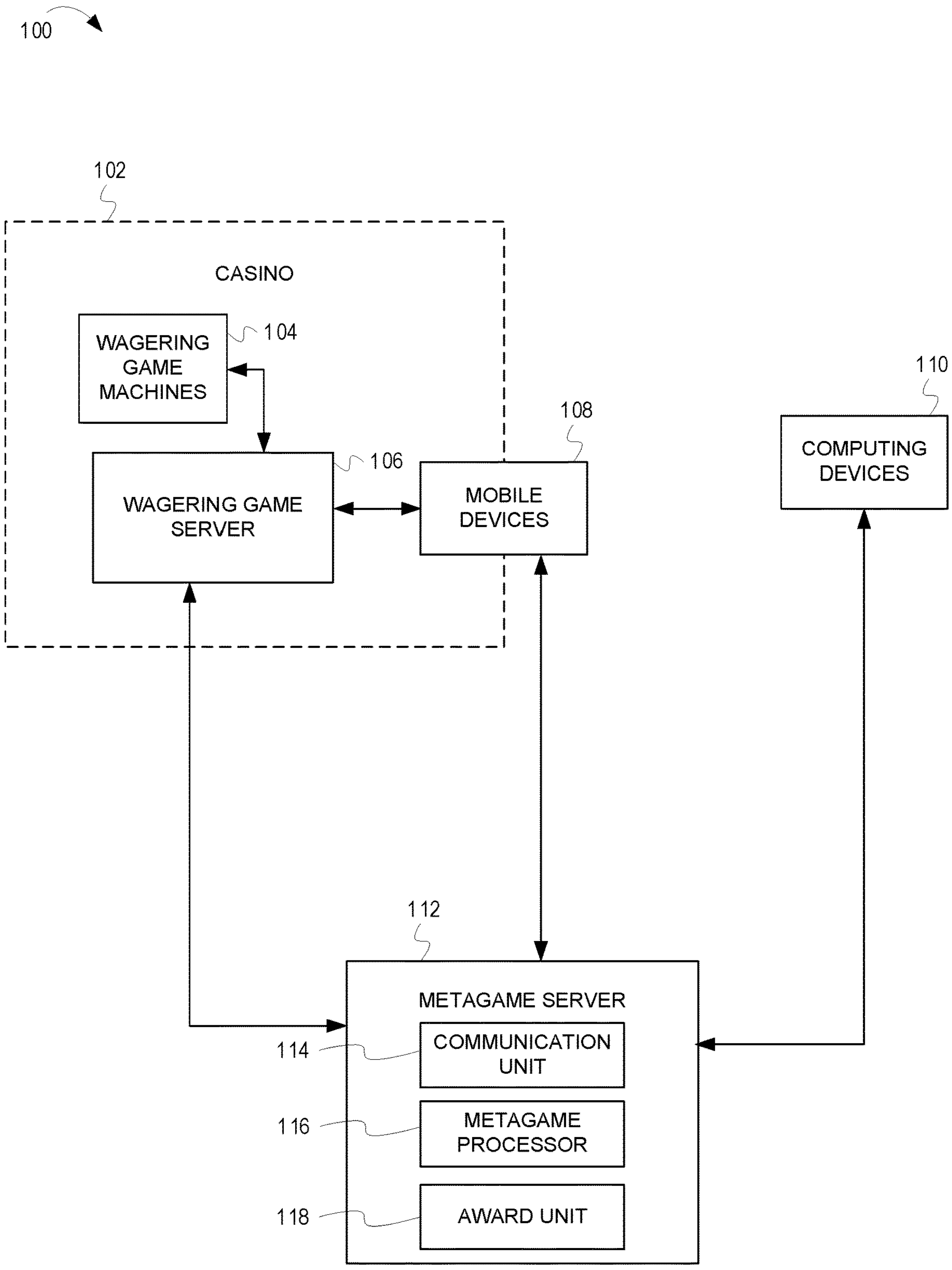
FIG. 1 is a block diagram depicting a system 100 for conducting metagames, according to some embodiments of the inventive subject matter.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF THE EMBODIMENTS

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words “and” and “or” shall be both conjunctive and disjunctive; the word “all” means “any and all”; the word “any” means “any and all”; and the word “including” means “including without limitation.”

For purposes of the present detailed description, the terms “wagering game,” “casino wagering game,” “gambling,” “slot game,” “casino game,” and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, wearable devices, etc.). When provided in a social or casual game format, the wagering game may closely resemble a traditional casino game, or it may take another form that more closely resembles other types of social/casual games.

Introduction

This section provides an introduction to some embodiments of the invention.

Traditionally, wagering games could only be played at brick-and-mortar casinos on wagering game machines that were dedicated solely to the play of wagering games. In recent years, wagering game play has expanded to devices outside of brick-and-mortar casinos, such as mobile devices (e.g., mobile phones, tablets, etc.) and personal computers. Many people also enjoy playing lottery games (e.g., those controlled by a state) such as scratch-off lottery tickets (i.e., "instant win" tickets) and jackpot tickets (e.g., Mega Millions®). However, in some instances, people who play wagering games may be a group that is mutually exclusive from those who play lottery games. Embodiments of the inventive subject matter seek to introduce lottery games to people who enjoy playing wagering games, and introduce wagering games to people who enjoy playing lottery games. Some embodiments of the inventive subject matter accomplish this by offering to players a metagame that includes both wagering game elements and lottery game elements.

Metagames that include both wagering game elements and lottery game elements pose challenges because they involve systems and data spanning multiple distinct technological paradigms. In some instances, metagames may span electronic wagering game paradigms, casual game paradigms, and ticket-based game paradigms. An electronic wagering game paradigm may require electronic wagering game systems to determine results of wagering games, store and track the results of wagering games, and utilize data from related systems (e.g., casino management systems). Additionally, the electronic wagering game paradigm can include many different technological platforms, such as spinning reel wagering game machines, video wagering game machines, and table games. A casual game paradigm may present games using many different platforms of electronic technologies, such as personal computers, mobile devices, etc. The casual game paradigm may also utilize many different technologies (e.g., social networking technologies, internet technologies, player tracking technologies, etc.) to host and/or implement casual games. A ticket-based game paradigm may utilize various ticket technologies, such as printing and anti-counterfeiting technologies, electronic distribution systems, electronic redemption systems, etc. Some embodiments of the inventive subject matter include a specialized metagame server that can track and utilize information associated with metagames operating across the different technological paradigms.

Although FIG. 1 describes some embodiments, the following sections describe many other features and embodiments.

FIG. 1 is a block diagram depicting a system 100 for conducting metagames. Embodiments of the inventive subject matter include a metagame that is played across multiple devices. The metagame can be "scavenger hunt" or "race" type game in which players accomplish tasks using different devices. Players can complete levels of the metagame by completing the tasks. The different devices can include mobile devices 108 (e.g., a mobile phone), computing devices 110 (e.g., a personal computer), and wagering game machines 104 (e.g., a slot machine in a casino). The tasks can include playing monetary wagering games (e.g., in a casino, on a mobile device, or on a personal computer), playing casual games (e.g., non-monetary wagering games), and playing lottery games. As one example, the metagame can require a player to: 1) play a casual game on a personal computer, 2) play a casual game on a mobile device, 3) play a lottery game and enter a ticket number associated with a lottery ticket on a mobile device or personal computer, and 4) play a wagering game on a wagering game machine in a casino. In some embodiments, once the player has completed all of the tasks, the player is entered into a drawing to win an award. The award can be a progressive-type jackpot. The progressive-type jackpot can be funded by advertising dollars, a portion of wagers (e.g., wagers placed during completion of tasks in the metagame), or any other suitable means. Alternatively, or in addition to the award for completing the metagame, the player can win awards as the player completes tasks. The awards can be monetary awards, virtual currency awards, goods and/or services, etc. For example, when the player enters the ticket number associated with the lottery ticket on the mobile device or personal computer, the player wins virtual currency that is usable in the metagame or other wagering or casual games. Additionally, the metagame can be a multiplayer game played among a social group or among the game-playing public in general. For example, the metagame can be a race type game in which the first player (or group of players) to complete each, or all, of the tasks wins an award.

As noted, the tasks can involve tickets (i.e., lottery tickets and virtual currency tickets) which can include virtual currency. The tickets can be for a lottery regulated by a state or other entity (i.e., a lottery ticket), or tickets that have only virtual currency value (i.e., virtual currency tickets). In some embodiments, lottery tickets offer an opportunity to win monetary value, and an opportunity to win virtual currency. In some embodiments, virtual currency tickets are guaranteed to be worth at least a specified amount of virtual currency with a possibility of being worth more. For example, a virtual currency ticket can be worth a minimum of 500 points, but upon play of the virtual currency ticket it is revealed that the virtual currency ticket is worth 1,000 points. The ticket can include a unique identifier (e.g., a ticket number, barcode, etc.) that indicates the ticket's value in terms of monetary value and/or virtual currency value.

Returning to FIG. 1, a system for conducting metagames is depicted. As depicted in FIG. 1, computing devices 110, mobile devices 108, and wagering game machines 104 in a casino 102 are in communication with a metagame server 112. The computing devices 110, mobile devices 108, and wagering game machines 104 communicate metagame activity to the metagame server 112. The metagame server is a specialized device including components (e.g., hardware and instructions) for tracking and utilizing data and information associated with metagames operating across many different technological paradigms. In some embodiments, the metagame server 112 includes a communication unit 114. The communication unit 114 can receive metagame communications from multiple systems across different technological paradigms. For example, the metagame server 112 can receive metagame communications from the wagering game server 106, mobile devices 108, and computing devices 110. The mobile devices 108 can be in the casino 102 or outside of a casino. In the casino 102, the mobile devices 108 can be used to play both wagering games and casual games. In some embodiments, the mobile devices 108 can pair with wagering game machines 104 to present wagering game content from the wagering game machines 104 or act as input devices for the wagering game machines 104. The wagering game machines 104 (and mobile devices 108 when inside the casino 102) can communicate with a wagering game server 106 to receive wagering game content, receive wagering game outcomes, report wagering game outcomes, etc. The wagering game server 106 communicates wagering game activity to the metagame server 112.

The metagame server 112 tracks and records metagame activity for players. The metagame activity includes activities performed for the metagame in each of the technological paradigms. For example, the metagame server 112 can receive communications from the wagering game server 106, mobile devices 108, and the computing devices 110 that indicate metagame activity. The metagame server 112 can also determine when to provide awards to players, determine what awards to provide to players, and provide awards to players. In some embodiments, the metagame server 112 includes an award unit 118 for determining awards for player and providing awards for players. In addition to tracking a recording metagame activity for players, the metagame server 112 can compile a leaderboard. In some embodiments, the metagame server 112 includes a metagame processor 116. In such embodiments, the metagame processor 116 can compile the leaderboard. The leaderboard can include players' names, players' locations, players' scores, players' progress, etc. The mobile devices 108, wagering game machines 104, and computing devices 110 can present the leaderboard. Additionally, display devices located in establishments selling tickets (i.e., lottery tickets and virtual currency tickets) can present the leaderboard.

Figure 2:
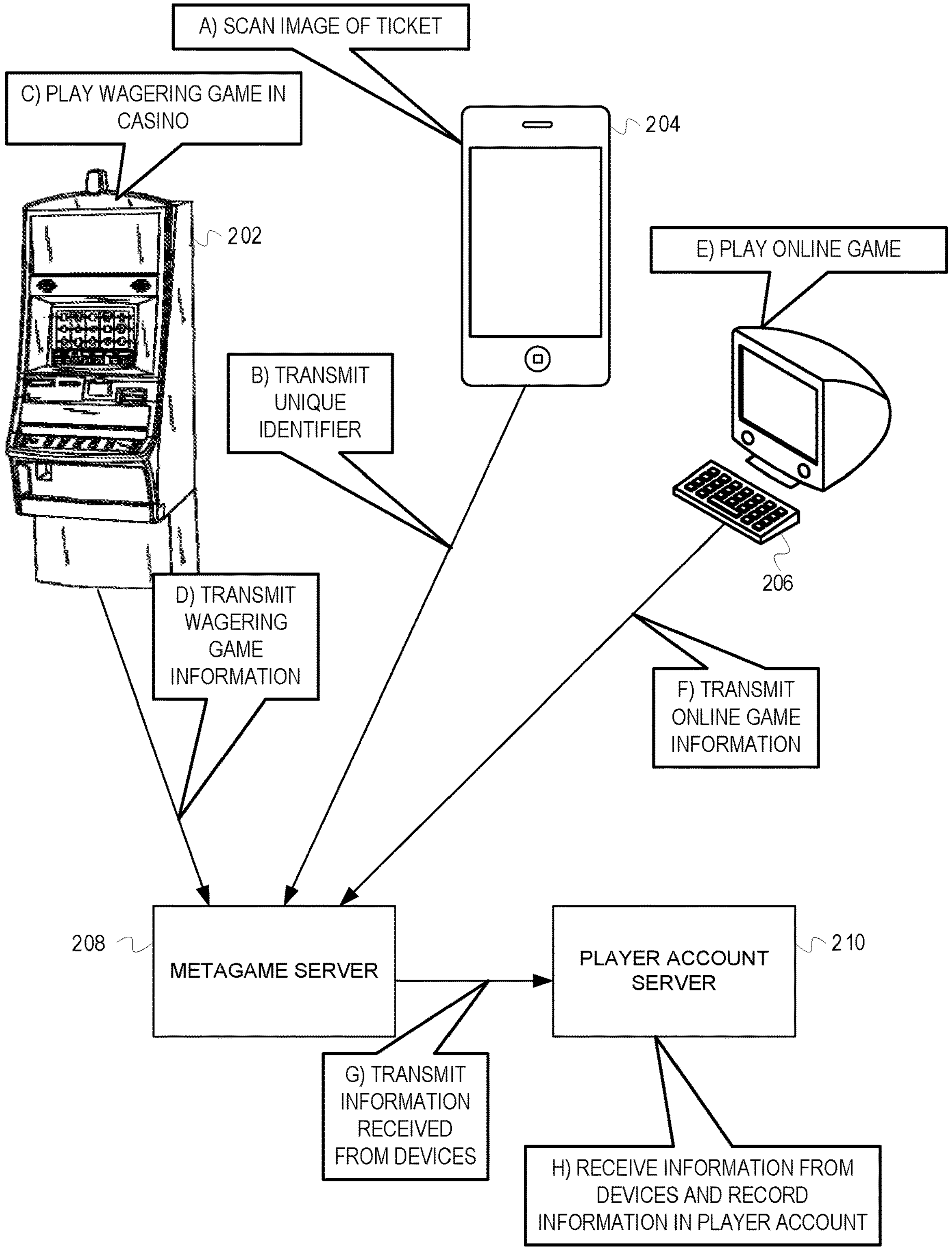
FIG. 2 is a conceptual diagram depicting communications between a mobile device 204, a wagering game machine 202, an electronic computing device 206, a metagame server 208, and a player account server 210 to facilitate a metagame across several devices.

While FIG. 1 depicts a system for conducting metagames, FIG. 2 depicts communications between the several technological paradigms during play of a metagame.

FIG. 2 is a conceptual diagram depicting communications between a mobile device 204, a wagering game machine 202, an electronic computing device 206, a metagame server 208, and a player account server 210 to facilitate a metagame across several devices. As discussed above, the metagame can be a scavenger hunt type game or race type game, and can include a single player or a group of players. The example metagame described by the communications depicted in FIG. 2 includes three tasks which must be completed on three devices. The three tasks are: 1) playing a lottery game and submitting an indication that the lottery game was played via the mobile device 204, 2) playing a wagering game on the wagering game machine 202, and 3) playing an online game on the computing device 206. FIG. 2 depicts operations at stages A-H. The stages are examples and are not necessarily discrete occurrences over time (e.g., operations of different stages may overlap).

At stage A, a mobile device 204 scans an image of a ticket (not pictured). The ticket can be a lottery ticket, a lottery ticket including a virtual currency award, or a virtual currency ticket. The ticket can include a unique identifier, such as a ticket number or barcode. The mobile device 204 can scan the ticket by capturing an image of the ticket, or by any other suitable process. The image can be an image of the entire ticket or a portion of the ticket. For example, the image may include only a unique identifier portion of the ticket. The mobile device 204 can process the image of the ticket to determine the unique identifier. In some embodiments the mobile device 204 captures the image and saves the image in a storage device of the mobile device 204 before processing the image. In other embodiments, the mobile device 204 processes the image while it is stored temporarily, for example in a camera buffer, of the mobile device 204. Alternatively, a player can enter the unique identifier on the mobile device 204. For example, the player can use the mobile device 204 (or any computing device) to login into a website associated with the metagame. Once logged in, the player can enter the unique identifier.

At stage B, the mobile device transmits the unique identifier to the metagame server 208. In embodiments in which the mobile device 204 processes the image, the mobile device 204 may transmit only the unique identifier. However, in such embodiments, the mobile device 204 can transmit both the unique identifier and the image. As previously discussed, in some embodiments, the mobile device 204 does not process the image. Instead the mobile device 204 transmits the image to the metagame server 208 and the metagame server 208 processes the image to determine the unique identifier. Alternatively, in embodiments in which the player enters the unique identifier on the mobile device 204, the mobile device 204 transmits the unique identifier to the metagame server 208. Regardless of the content included in the transmission from the mobile device 204 to the metagame server 208, the transmission indicates that the player has completed the lottery game portion of the metagame. In some embodiments, the player must complete a first task before a second task is enabled or known to the player. For example, the player may have to complete the lottery portion of the metagame before the player can complete a wagering game portion of the metagame.

At stage C, the player plays a wagering game via a wagering game machine 202 in a casino (or other facility offering wagering games). The metagame may require the player to play a specific wagering game (e.g., a specific wagering game offered by a specific wagering game company), any wagering game offered by a specific wagering game company, any wagering game in a specific casino, etc. For example, the wagering game played via the wagering game machine 202 can have a theme that is consistent with the metagame. In some embodiments, the ticket referred to in the discussion of stage A can include a virtual currency award. In such embodiments, the virtual currency may be usable in the wagering game. For example, the virtual currency can be used to "purchase" spins or enhancements in a slots game, "purchase" wager insurance for the wagering game, upgrade and/or modify an avatar associated with the player's player account, or increase the player's social status. The wagering game can award, in addition to monetary value, virtual currency. The virtual currency can be specific to the metagame.

At stage D, the wagering game machine 202 transmits wagering game information to the metagame server 208. The wagering game information indicates that the player completed the wagering game machine portion of the metagame. In some embodiments, the wagering game machine 202 transmits the wagering game information directly to the metagame server 208. In other embodiments, the wagering game machine 202 transmits the wagering game information to a wagering game server (not pictured), which transmits the wagering game information to the metagame server 208.

At stage E, the player plays an online game via computing device 206. The computing device 206 can be any device upon which a player can play the online game (e.g., a personal computer, a tablet, a mobile device, etc.). The online game can be a non-monetary casual game or a monetary wagering game. The casual game can be any type of game. For example, the casual game can be a game presented via a social networking website, a game that resembles a monetary wagering game presented via a non-monetary gaming website, etc. The online game can be a specific game related to the metagame (e.g., having a theme that is consistent with the metagame), any game provided by an entity associated with the metagame, or any game played via a computing device. The online game can also award monetary value and/or virtual currency. The virtual currency can be specific to the metagame and usable during different portions of the metagame.

At stage F, the computing device 206 transmits the online game information to the metagame server 208. The online game information can include results of the online game, a type of the online game, or simply an indication that the player played the online game.

At stage G, the metagame server 208 transmits the information received from the mobile device 204, the wagering game machine 202, and the computing device 206 to the player account server 210. The metagame server 208 can transmit information as it is received, or transmit information once all stages of the metagame are complete. For example, upon receiving the image of the ticket from the mobile device 204, the metagame server 208 can transmit the image of the ticket (or an indication that the player has completed the lottery game portion of the metagame) to the player account server 210.

At stage H, the player account server 210 receives the information from the metagame server 208 and records the information in the player account associated with the player. The player account server 210 can also flag or otherwise indicate player accounts that have completed certain of the metagame tasks or all of the metagame tasks. For example, if the first player to complete all three tasks of the exemplary metagame wins an award, the player account server 210 can monitor player accounts to determine if any of players of the metagame have completed all three tasks. When a player completes all three tasks, the player account server can flag the player account of the player who completed all three tasks. The player account server 210 (or the metagame server 208) can award the player who completed all three tasks.

Awarding the first player that completes all three tasks is but one example of how awards can be distributed for the metagame. In some embodiments, the first player to complete each of the tasks is awarded. For example, the first player to complete the lottery game portion of the metagame is awarded, the first player to complete the wagering game portion of the metagame is awarded, and the first player to complete the online game portion of the metagame is awarded. In such embodiments, the player account server 210 monitors player accounts and flags player accounts associated with the players that complete each task first. As another example, all players who complete the metagame by a completion date are entered into a drawing. After the completion date has passed, the player account server 210 compiles a list of players that have completed the metagame. The player account server 210 (or the metagame server 208) can enter each player in a drawing. One or more of the players can be selected from the drawing as winners. As another example, the first player to complete the tasks in a specific sequence (e.g., a pre-specified sequence) is awarded. For example, the first player to complete the wagering game portion of the metagame, the lottery game portion of the metagame, and the online game portion of the metagame, in that order, is awarded. The sequence in which players must complete the tasks can be the same for each player or different for each player. For example, the sequence in which each player must complete the tasks may be randomly determined. Further, in some embodiments, the players may not know the sequence in which they must complete the tasks to win. Although several examples are provided, the one or more players that are awarded can be determined in any suitable manner.

Although the discussion of FIG. 2 describes the player account server 210 as tracking completion of tasks by players, in some embodiments, the metagame server 208 tracks completion of tasks by players. In such embodiments, the metagame server 208 determines when players complete tasks and reports awards to the player account server 210.

Figure 3:
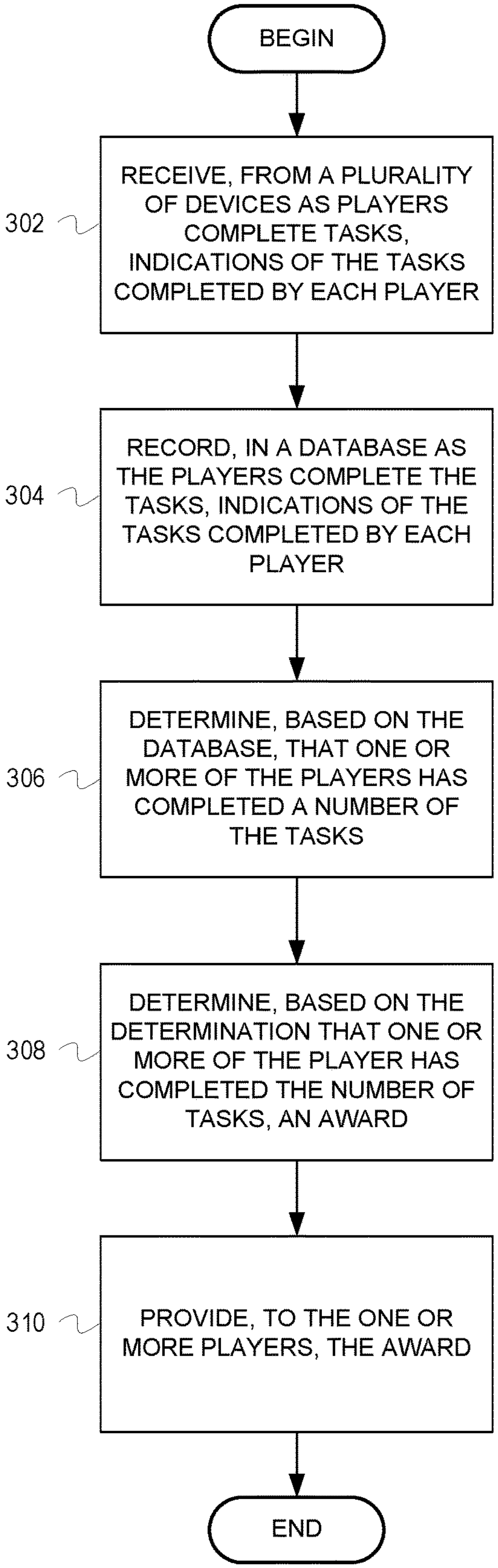
FIG. 3 is a flow diagram depicting example operations for conducting a metagame across several devices.

While FIG. 2 depicts example communications between several devices during a metagame, FIG. 3 is a flow diagram depicting example operations performed by a metagame server and/or player account server during the metagame.

FIG. 3 is a flow diagram depicting example operations for conducting a metagame across several devices. The flow begins at block 302.

At block 302, a metagame server receives, from a plurality of devices, indications that metagame tasks have been completed by one or more of the players. The plurality of devices can be associated with multiple technological paradigms. For example, the devices can be part of a casual game paradigm, and a ticket-based game paradigm. In some embodiments, the metagame server's communication unit can receive the indications. As discussed previously, the metagame can require a player to complete multiple tasks on several different devices. Additionally, the metagame can be a single player game or a multiplayer game in which players compete with one another. As players complete tasks, the metagame server receives indications of the tasks completed by the players from the devices. For example, the metagame server receives indications that $Player_1$ has completed $Task_1$, $Player_2$ has completed $Task_2$, and $Player_3$ has completed $Task_2$. The flow continues at block 304.

At block 304, the metagame server records, in a database as the players complete the tasks, indications of the tasks completed by each of the players. For example, the metagame server's metagame processor can record the indications in the database. In some embodiments, the database is specific to the metagame and includes player identities (e.g., player names or tracking numbers) and a list of the tasks completed by the players. In other embodiments, the metagame server can record the tasks completed by the players in a preexisting player account database, for example, a casino player tracking server. The metagame server can also track gameplay metrics (e.g., devices used by players, bets made by players, number of players with existing player accounts, time between games, order of game play, etc.). The flow continues at block 306.

At block 306, the metagame server determines, based on the database, that one or more of the players has completed a number of the tasks. For example, the metagame server's metagame processor can determine that one or more of the players has completed a number of the tasks. The metagame server can determine winners of the metagame either upon receipt of indications of completed tasks or at the end of the metagame. For example, if players are awarded as they complete each task, the metagame server can determine one or more players to award upon receipt of the indications. As another example, if a winner is chosen from a pool of all players that have completed the tasks by a specific date, the metagame server can determine one or more players to award after the specific date has passed. The flow continues at block 308.

At block 308, the metagame server determines, based on the determination that one or more of the players has completed the number of tasks, an award. For example, the metagame server's award unit can determine an award for the one or more players. As previously discussed, there are many ways in which to award players of the metagame. As one example, all players that complete all of the tasks by a specific date can be entered into a drawing. After the specific date has passed, the metagame server can select one or more of the players from the drawing. As another example, the first player to complete all of the tasks can be awarded. Just as there are many ways to determine one or more winners of the metagame, there are many ways to award the one or more winners of the metagame. In embodiments in which only one player wins the metagame, the one player can be awarded a jackpot. In embodiments in which multiple players can win portions, or all, of the metagame, the multiple players can share a jackpot. Additionally, the award can be monetary or non-monetary. For example, players can be awarded virtual currency, goods, and/or services as they complete tasks in the metagame or complete the metagame. Which player(s) to award can be determined using any suitable means and the award(s) that the player(s) receives can be anything of value or perceived value. The flow continues at block 310.

At block 310, the metagame server provides the award to the one or more players. For example, the metagame server's award unit can provide the award to the one or more players. Again, the metagame server can determine which player(s) to award using any suitable means and the metagame server can award the players anything of value or perceived value. For example, the metagame server can deposit the awards in player accounts associated with the one or more players.

Although the discussion of FIG. 3 refers to the metagame server as performing each of the example operations, embodiments are not so limited. In some embodiments, a player account server can perform all or some of the operations depicting in FIG. 3. For example, the player account can house the database and the player account server can determine, based on the database, that one or more of the players has completed a number of the tasks. Additionally, in some embodiments, the metagame server and the player account server can reside on the same hardware device.

Figure 4A:
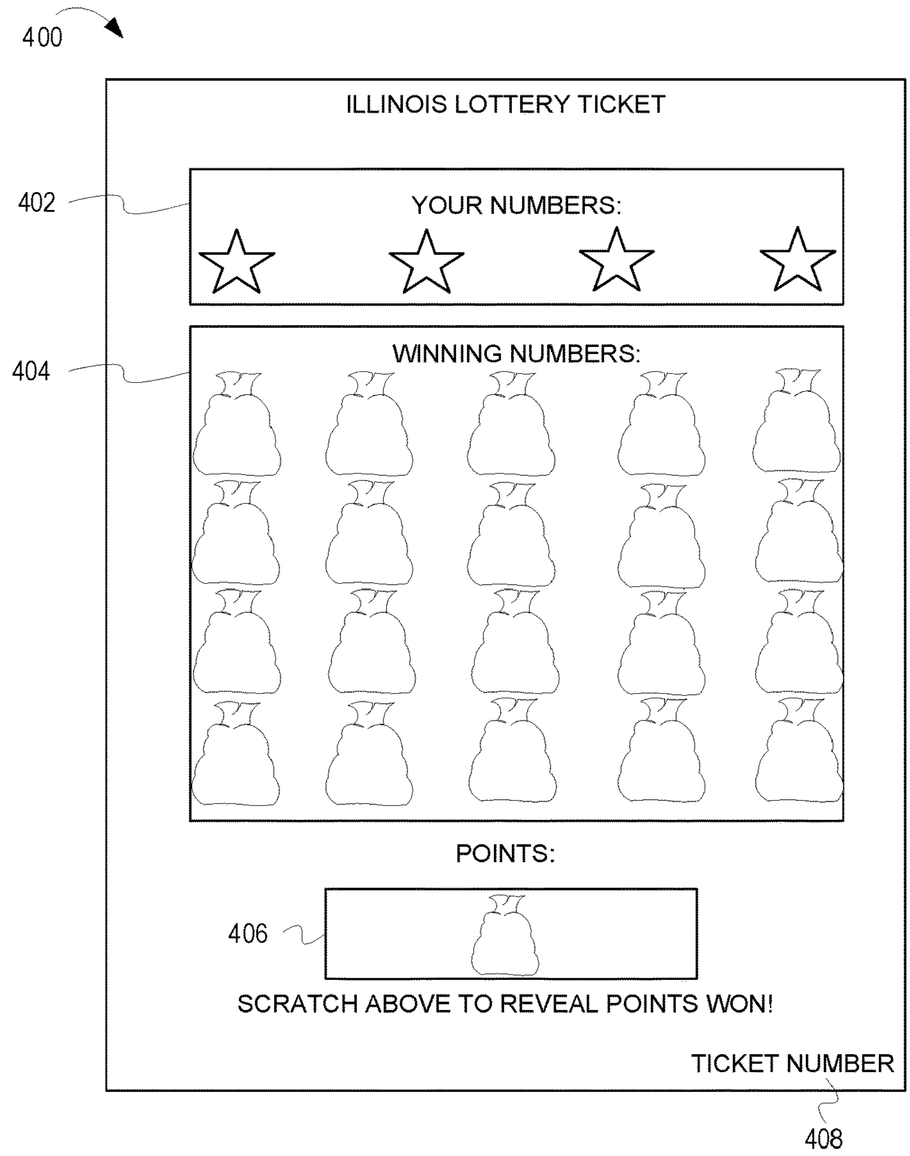
FIG. 4A depicts a scratch-off type lottery ticket 400 including a virtual currency award before the lottery ticket 400 is played, according to some embodiments of the inventive subject matter.
Figure 4B:
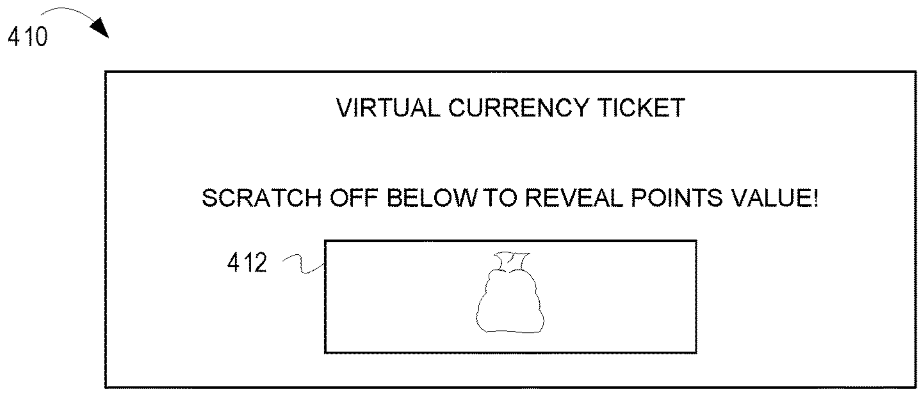
FIG. 4B depicts a scratch-off type virtual currency ticket 410 before the virtual currency ticket 410 is played, according to some embodiments of the inventive subject matter.

While FIG. 3 describes example operations for conducting a metagame, FIGS. 4A and 4B depict example tickets for use in a games and metagames. In some instances, the tickets can be used exclusively in a ticket-based game paradigm. However, embodiments of the inventive subject matter can conduct metagames by utilizing these and other tickets, and any associated ticket-based gaming systems.

FIG. 4A depicts a scratch-off type lottery ticket 400 including a virtual currency award before the lottery ticket 400 is played, according to some embodiments of the inventive subject matter. The lottery ticket 400 depicted in FIG. 4 includes a covering which can be "scratched off" to reveal content (e.g., winning numbers, an award, etc.). The lottery ticket 400 is similar to a conventional instant win type lottery ticket, but includes, in addition to a monetary award, a non-monetary award. The non-monetary award included on the lottery ticket 400 is a virtual currency award.

The lottery ticket 400 includes a "Your Numbers" section 402, a "Winning Numbers" section 404, and a "Points" section 406. A player scratches the covering off of the lottery ticket 400 to reveal numbers in the "Your Numbers" section 402, numbers in the "Winning Numbers" section 404, and a virtual currency award in the "Points" section 406. The lottery ticket 400 also includes a ticket number 408. The ticket number 408 uniquely identifies the lottery ticket 400 and can take any suitable form (e.g., a numeric code, and alphanumeric code, a barcode, etc.).

Figure 5A:
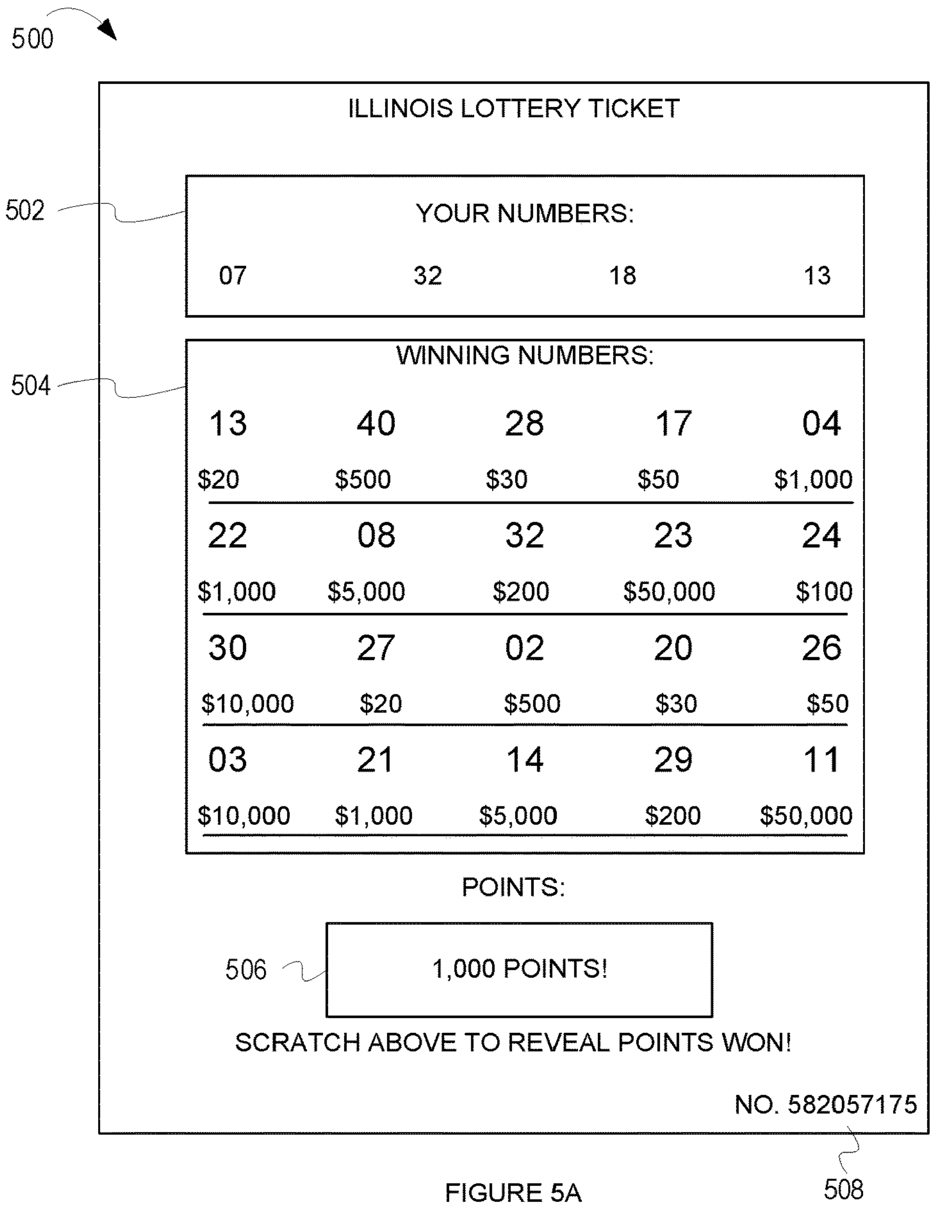
FIG. 5A depicts a scratch-off type lottery ticket 500 including a virtual currency award after the lottery ticket 500 is played, according to some embodiments of the inventive subject matter.

While FIG. 4A depicts a lottery ticket 400 before the lottery ticket 400 is played, FIG. 5A depicts the same lottery ticket 500 after the player has scratched off the covering so as to reveal content of the lottery ticket 500.

FIG. 5A depicts a scratch-off type lottery ticket 500 including a virtual currency award after the lottery ticket 500 is played, according to some embodiments of the inventive subject matter. As depicted in FIG. 5, the "Your Numbers" section 502 includes the numbers "07," "32," "18," and "13." The "Winning Numbers" section 504 includes the numbers "13," "40," "28," "17," "04," "22," "08," "32," "23," "24," "30," "27," "02," "20," "26," "03," "21", "14," "29," and "11." Additionally, the lottery ticket 500 also includes a monetary value under each number in the "Winning Numbers" section 504. If any of the numbers in the "Your Numbers" section 502 match a number in the "Winning Numbers" section 504, the player wins the monetary value listed below the number in the "Winning Numbers" section 504. For example, both the "Your Numbers" section 502 and the "Winning Numbers" section 504 include the number "13." Consequently, the player wins the monetary value (i.e., $20) listed below the number "13" in the "Winning Numbers" section 504. Also depicted in FIG. 5A, the player has scratched off the covering on the "Points" section 506 to reveal an award of 1,000 points. Consequently, the lottery ticket 500 awarded 1,000 virtual currency points to the player. Scratching the covering off of the lottery ticket also reveals the lottery ticket's 500 ticket number 508.

FIG. 4B depicts a scratch-off type virtual currency ticket 410 before the virtual currency ticket 410 is played, according to some embodiments of the inventive subject matter. Like the lottery ticket depicted in FIGS. 4A and 5A, the virtual currency ticket 410 includes a non-monetary (e.g., virtual currency award). In some embodiments, the virtual currency ticket 410 is similar to an instant win type lottery ticket in which an award is revealed when a covering is scratched off the virtual currency ticket 410. As depicted in FIG. 4B, the virtual currency ticket 410 includes a "Points" section 406. However, the virtual currency ticket 410 is not a lottery ticket in that it is not associated with a lottery which awards monetary value and is regulated by a state (or some other entity). In some embodiments, players purchase virtual currency tickets for a set price. The virtual currency tickets are guaranteed to award a certain number of points (e.g., virtual currency). For example, a $5 virtual currency ticket may be guaranteed to award at least 50 points and a $10 virtual currency ticket may be guaranteed to award at least 100 points.

Figure 5B:
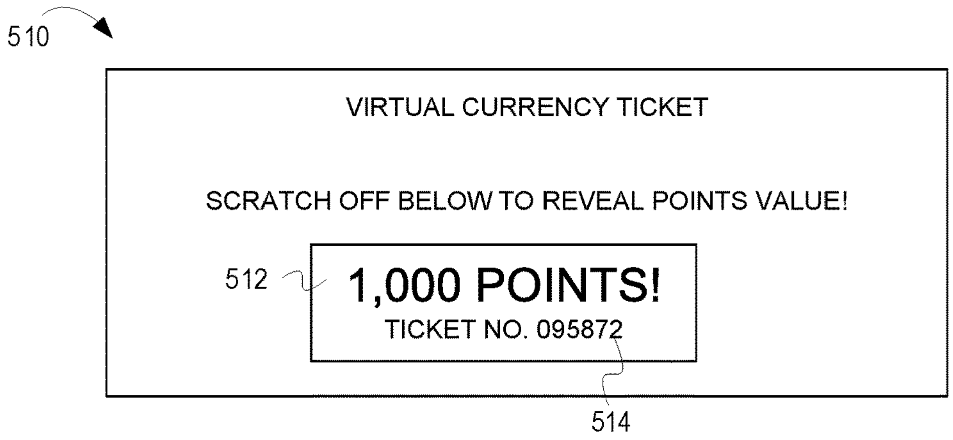
FIG. 5B depicts a scratch-off type virtual currency ticket 510 after the virtual currency ticket 510 is played, according to some embodiments of the inventive subject matter.

FIG. 5B depicts a scratch-off type virtual currency ticket 510 after the virtual currency ticket 510 has been played, according to some embodiments of the inventive subject matter. As depicted in FIG. 5B, a player has scratched the covering off of the virtual currency ticket 510 to reveal an award. The "Points" section 512 reveals an award of 1,000 points. The "Points" section also includes a ticket number 514 which uniquely identifies the virtual currency ticket 510.

Figure 6:
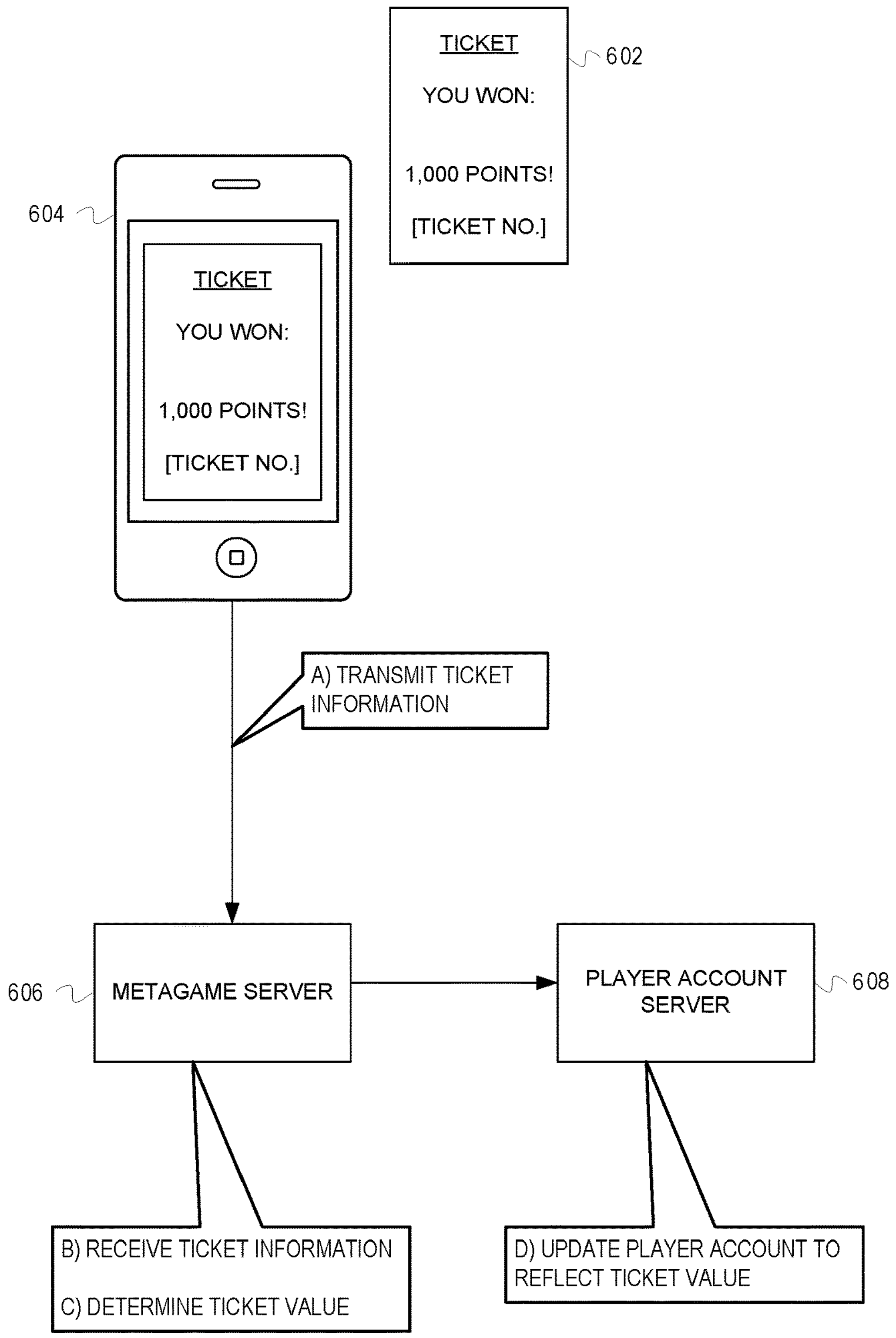
FIG. 6 is a conceptual diagram depicting example communications between a mobile device 604, server metagame server 606, and a player account server 608 for depositing virtual currency associated with a ticket 602 in a player account.

While FIGS. 4A, 4B, 5A, and 5B depict lottery and virtual currency tickets before and after play, FIG. 6 is a conceptual diagram depicting use of a lottery ticket or virtual currency ticket in a game or metagame environment.

FIG. 6 is a conceptual diagram depicting example communications between a mobile device 604, a metagame server 606, and a player account server 608 for depositing virtual currency associated with a ticket 602 in a player account. The ticket 602 depicted in FIG. 6 can be a lottery ticket or a virtual currency ticket. Although FIG. 6 depicts communications for depositing virtual currency associated with a ticket 602 in a player account, in some embodiments the ticket 602 is used as part of a metagame. FIG. 6 depicts operations at stages A-D. The stages are examples and are not necessarily discrete occurrences over time (e.g., operations of different stages may overlap).

At stage A, the mobile device transmits ticket information associated with the ticket 602 to the metagame server 606. The ticket information can be any information which identifies the ticket 602. For example, the ticket information can be a unique identifier such as an alphanumeric code or barcode. The mobile device 604 captures an image of the ticket 602. The mobile device 604 can use an image capture device (e.g., a camera) to capture an image of the ticket 602. In some embodiments, the mobile device 604 uses image processing software to determine ticket information associated with the ticket 602. In other embodiments, a player enters the ticket information on the mobile device 604. After the ticket information is determined by (or entered on) the mobile device 604, the mobile device 604 transmits the ticket information to the metagame server 606.

At stage B, the metagame server 606 receives the ticket information from the mobile device 604. In embodiments where the mobile device 604 processes an image of the ticket 602 or receives the ticket information via player entry, the mobile device 604 transmits the ticket information to the metagame server 606. In addition to the ticket information, the mobile device 604 can also transmit the image of the ticket to the metagame server 606. In some embodiments, the mobile device 604 does not process the image of the ticket to determine the ticket information. In such embodiments, the mobile device 604 transmits the image of the ticket to the metagame server 606 and the metagame server 606 processes the image of the ticket to determine the ticket information.

At stage C, the metagame server 606 determines a value associated with the ticket 602. The value associated with the ticket 602 can be virtual currency. As depicted in FIG. 6, the value associated with the ticket 602 is 1,000 points. The metagame server 606 determines the value associated with the ticket 602 based on the ticket information. In embodiments in which the ticket 602 includes a unique identifier, the metagame server 606 can reference a database to determine the value associated with the ticket 602. In other embodiments, the ticket information may not uniquely identify the ticket 602, but rather identify the value associated with the ticket 602. For example, a unique identifier can be associated with each possible ticket value. In such embodiments, each ticket having a value of 1,000 points may have the same unique identifier, all tickets having a value of 500 points may have the same unique identifier, all tickets have a value of 250 points may have the same unique identifier, etc.

At stage D, the player account server 608 updates a player account associated with the player to reflect the ticket value. As depicted in FIG. 6, the ticket 602 has a value of 1,000 points. The player account server 608 updates the player's player account to include the 1,000 points awarded by the ticket 602. In embodiments in which the ticket 602 is associated with a metagame, the player account server 608 can update the player's player account to indicate that the player has completed a lottery portion of the metagame.

Figure 7:
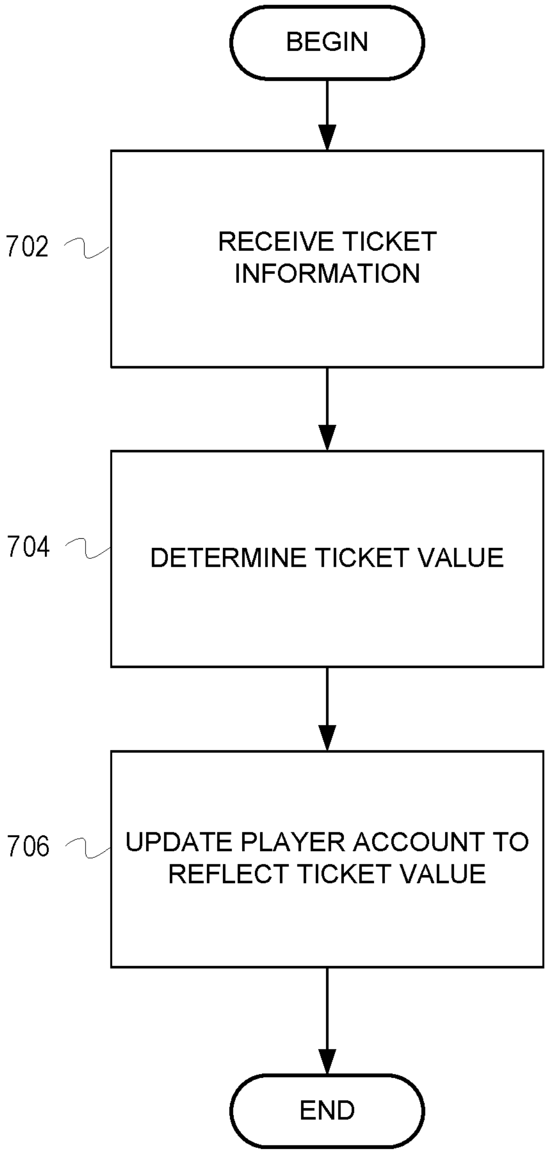
FIG. 7 is a flow diagram depicting example operations for depositing virtual currency associated with a ticket in a player account.

While FIG. 6 depicts example communications for depositing value associated with a ticket in a player account, FIG. 7 is a flow diagram depicting example operations for depositing value associated with a ticket in a player account.

FIG. 7 is a flow diagram depicting example operations for depositing virtual currency associated with a ticket in a player account. The flow beings at block 702.

At block 702, a metagame server receives ticket information associated with a ticket. The ticket can be a lottery ticket or a virtual currency ticket. The ticket information can include an identifier (e.g., an alphanumeric code or barcode) that uniquely identifies the ticket. The metagame server can receive the ticket information from a mobile device, a personal computer, a wagering game machine, etc. A player can use an electronic computing device to scan or enter the ticket information. The flow continues at block 704.

At block 704, the metagame server determines a value associated with the ticket. The value associated with the ticket can be determined based on the ticket information. For example, the metagame server can use a database and the identifier to determine the value associated with the ticket. The flow continues at block 706.

At block 706, the metagame server updates a player account associated with the player to reflect the value associated with the ticket. For example, if the value associated with the ticket is 500 points, the metagame server can add 500 points to the player account associated with the player.

Operating Environment

This section describes an example operating environment and presents structural aspects of some embodiments. This section includes discussion about wagering game machine architectures and wagering game networks.

Wagering Game Machine Architectures

Figure 8:
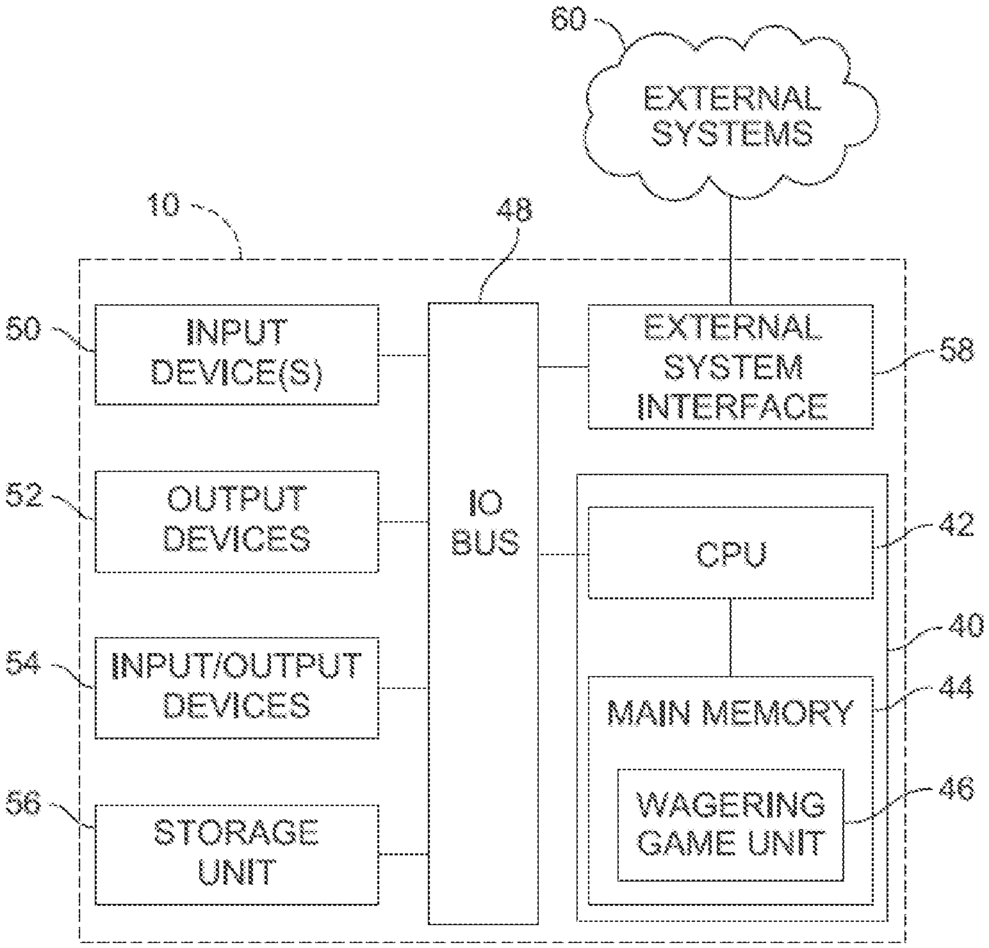
FIG. 8 is a block diagram of a gaming machine architecture, according to example embodiments of the inventive subject matter.

Turning now to FIG. 8, there is shown a block diagram of a gaming machine architecture. The gaming machine 10 includes game-logic circuitry 40 securely housed within a locked box inside the gaming cabinet 12 (see FIG. 10). The game-logic circuitry 40 includes a central processing unit (CPU) 42 connected to a main memory 44 that comprises one or more memory devices. The CPU 42 may include any suitable processor(s), such as those made by Intel and AMID. By way of example, the CPU 42 may include a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+frontside bus and a PCI backside bus. The I/O bus 48 is connected to various input devices 50, output devices 52, and input/output devices 54 such as those discussed below in connection with FIG. 10. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

In general, the main memory 44 (comprising one or more memory devices) stores programming for an RNG, game-outcome logic, and game assets (e.g., art, sound, etc.) When a wagering-game instance is executed, the CPU 42(comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 8. Any component of the gaming-machine architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

While FIG. 8 describes an example wagering game machine architecture, this section continues with a discussion wagering game networks.

Wagering Game Networks

Figure 9:
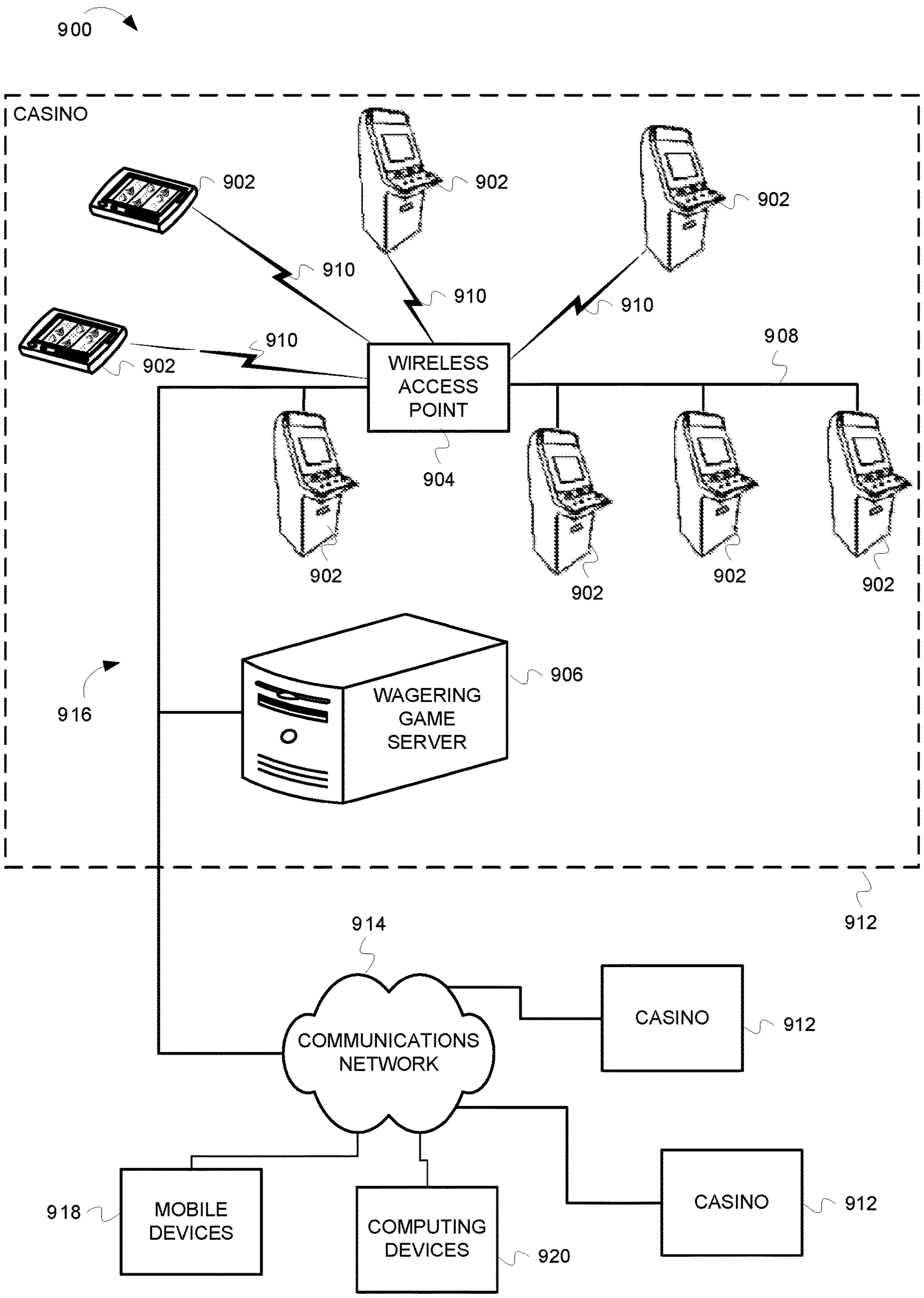
FIG. 9 is a block diagram illustrating a wagering game network 900, according to example embodiments of the inventive subject matter.

FIG. 9 is a block diagram illustrating a wagering game network 900, according to example embodiments of the inventive subject matter. As shown in FIG. 9, the wagering game network 900 includes a plurality of casinos 912 connected to a communications network 914. Additionally, the wagering game network 900 includes mobile devices 918 and 920 connected to the communications network 914.

Each casino 912 includes a local area network 916, which includes an access point 904, a wagering game server 906, and wagering game machines 902. The access point 904 provides wireless communication links 910 and wired communication links 908. The wired and wireless communication links can employ any suitable connection technology, such as Bluetooth, 802.11, Ethernet, public switched telephone networks, SONET, etc. In some embodiments, the wagering game server 906 can serve wagering games and distribute content to devices located in other casinos 912 or at other locations on the communications network 914.

The wagering game machines 902 described herein can take any suitable form, such as floor standing models, handheld mobile units, bartop models, workstation-type console models, etc. Further, the wagering game machines 902 can be primarily dedicated for use in conducting wagering games, or can include non-dedicated devices, such as mobile phones, personal digital assistants, personal computers, etc. In one embodiment, the wagering game network 900 can include other network devices, such as accounting servers, wide area progressive servers, player tracking servers, and/or other devices suitable for use in connection with embodiments of the invention.

In some embodiments, wagering game machines 902 and wagering game servers 906 work together such that a wagering game machine 902 can be operated as a thin, thick, or intermediate client. For example, one or more elements of game play may be controlled by the wagering game machine 902 (client) or the wagering game server 906 (server). Game play elements can include executable game code, lookup tables, configuration files, game outcome, audio or visual representations of the game, game assets or the like. In a thin-client example, the wagering game server 906 can perform functions such as determining game outcome or managing assets, while the wagering game machine 902 can present a graphical representation of such outcome or asset modification to the user (e.g., player). In a thick-client example, the wagering game machines 902 can determine game outcomes and communicate the outcomes to the wagering game server 906 for recording or managing a player's account.

In some embodiments, either the wagering game machines 902 (client) or the wagering game server 906 can provide functionality that is not directly related to game play. For example, account transactions and account rules may be managed centrally (e.g., by the wagering game server 906) or locally (e.g., by the wagering game machine 902). Other functionality not directly related to game play may include power management, presentation of advertising, software or firmware updates, system quality or security checks, etc.

Any of the wagering game network components (e.g., the wagering game machines 902) can include hardware and machine-readable media including instructions for performing the operations described herein.

Example Wagering Game Machines

Figure 10:
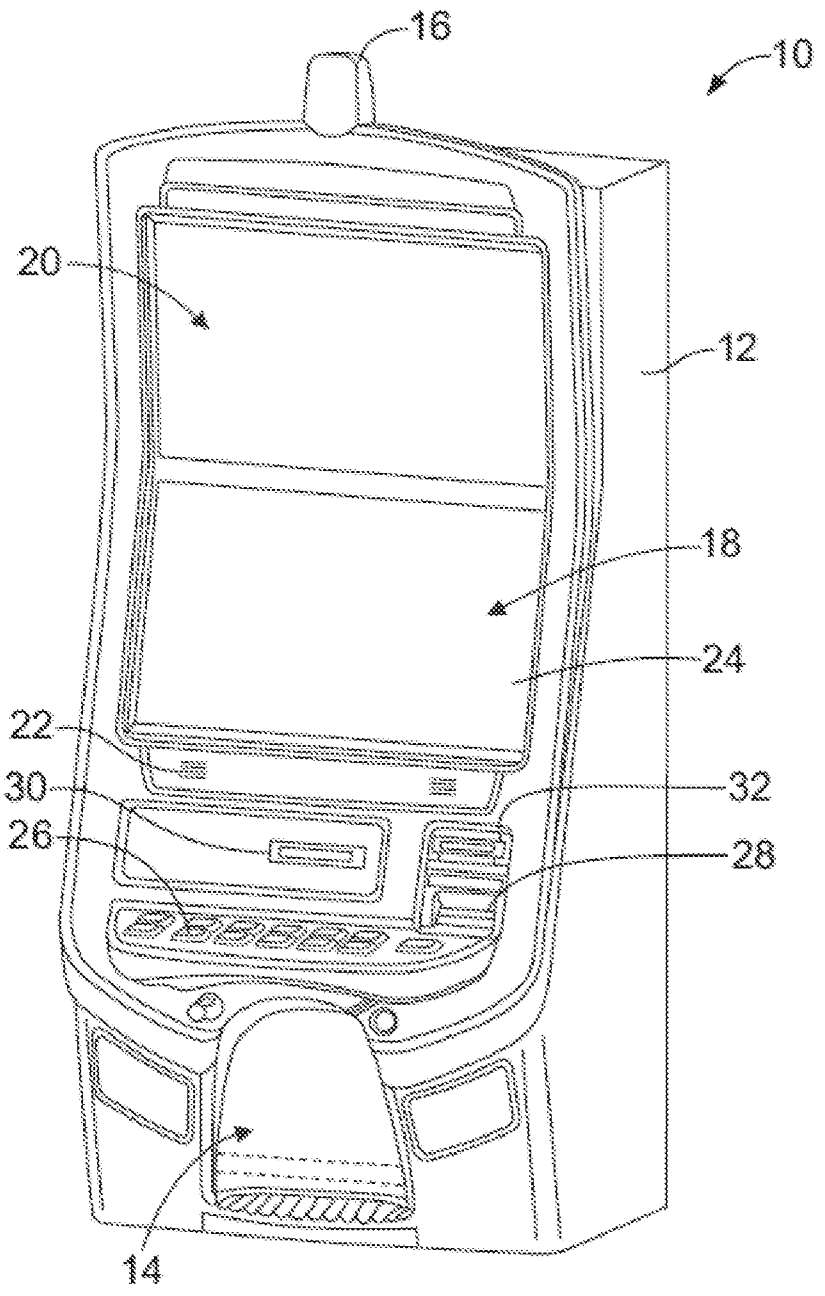
FIG. 10 is a gaming machine 10 similar to those operated in gaming establishments, such as casinos.

Referring to FIG. 10, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 10 comprises a gaming cabinet 12 that may house various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary display area 18, a secondary display area 20, and one or more audio speakers 22. The primary display area 18 or the secondary display area 20 may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 24 mounted over the primary or secondary displays, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The input devices, such as the touch screen 24, buttons 26, a mouse, a joystick, a gesture-sensing device, a voice-recognition device, and a virtual-input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. The value input devices are used to deposit a physical item associated with a monetary value that establishes a credit balance. For example, a player can use a value input device to deposit cash or credits onto the gaming machine 10. The cash or credits are used establish a credit balance and to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. The value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method for operating a gaming system, the method comprising:

providing, by one or more controllers, a wagering game including a plurality of tasks, the plurality of tasks including a first task, a second task, and a third task, wherein the first task must be performed via a wagering game machine in a land-based casino, the wagering game machine including a random-number generator, wherein the second task must be performed online, and wherein the third task must be performed via a ticket;

establishing a player account in at least one memory device;

generating, by the random-number generator of the wagering game machine, one or more random numbers to determine an outcome of a game conducted at the wagering game machine;

determining, by at least one of the one or more controllers, the first task is completed based at least in part on the outcome;

causing, by at least one of the one or more controllers via an application installed on a player mobile device, the player mobile device to capture an image of at least a portion of the ticket;

in response to receiving the captured image, processing, by at least one of the one or more controllers, the captured image to extract a visible unique identifier associated with the ticket from the captured image, the visible unique identifier indicating the third task is completed;

determining, by at least one of the one or more controllers, that one or more of the plurality of tasks have been completed by a player associated with the player account;

in response to the determination that one or more of the plurality of tasks have been completed, generating, by at least one of the one or more controllers, a code to be transmitted to the player mobile device, wherein the one or more controllers are configured to unlock a subsequent task of the plurality of tasks in response to a device associated with the subsequent task receiving the transmitted code; and assigning, in response to the determining and by at least one of the one or more controllers, an award to the player account, wherein the award varies according to a sequence in which the plurality of tasks is completed.

2. The method of claim 1, wherein the award is selected from a group consisting of a monetary amount, a virtual currency amount, a number of entries into a drawing for a monetary amount, and a number of entries into a drawing for a virtual currency amount.

3. The method of claim 1, further comprising:

randomly determining, by at least one of the one or more controllers, the sequence associated with a highest value of the award.

4. The method of claim 1, wherein the determining includes determining that the one or more of the plurality of tasks have been completed by the player in a pre-specified sequence.

5. The method of claim 1, wherein the establishing includes establishing additional player accounts in the at least one memory device, and wherein the determining includes determining that the one or more of the plurality of tasks have been completed by the player associated with the player account prior to the one or more of the plurality of tasks being completed by additional players associated with respective ones of the additional player accounts.

6. The method of claim 1, further comprising:

assigning virtual currency to the player account in response to completion of the third task, the virtual currency being redeemable for enhancements in an online social game.

7. The method of claim 1, wherein the second task must be performed online in one of a casual game or a monetary gambling game.

8. A gaming system comprising one or more controllers and a wagering game machine having a random number generator configured to generate one or more random numbers to determine an outcome of a game conducted at the wagering game machine, the one or more controllers configured to:

provide a wagering game including a plurality of tasks, the plurality of tasks including a first task, a second task, and a third task, wherein the first task must be performed via the wagering game machine in a land-based casino, the second task must be performed online, and the third task must be performed via a ticket;

determine the first task is completed based at least in part on the outcome of the game conducted at the wagering game machine;

establish a player account in at least one memory device associated with the one or more controllers;

cause, via an application installed on a player mobile device, the player mobile device to capture an image of at least a portion of the ticket;

in response to receiving the captured image, process the captured image to extract a visible unique identifier associated with the ticket from the captured image, the visible unique identifier indicating the third task is completed;

determine that one or more of the plurality of tasks have been completed by a player associated with the player account;

in response to the determination that one or more of the plurality of tasks have been completed, generate a code to be transmitted the player mobile device, wherein the one or more controllers are configured to unlock a subsequent task of the plurality of tasks in response to a device associated with the subsequent task receiving the transmitted code; and assign, in response to determining the completed one or more tasks, an award to the player account, wherein the award varies according to a sequence in which the plurality of tasks is completed.

9. The gaming system of claim 8, wherein the award is selected from a group consisting of a monetary amount, a virtual currency amount, a number of entries into a drawing for a monetary amount, and a number of entries into a drawing for a virtual currency amount.

10. The gaming system of claim 8, wherein the one or more controllers are further configured to randomly determine the sequence associated with a highest value of the award.

11. The gaming system of claim 8, wherein the one or more controllers determines that the one or more of the plurality of tasks have been completed by the player in a pre-specified sequence.

12. The gaming system of claim 8, wherein the one or more controllers is further configured to:

establish additional player accounts in the at least one memory device; and determine that the one or more of the plurality of tasks have been completed by the player associated with the player account prior to the one or more of the plurality of tasks being completed by additional players associated with respective ones of the additional player accounts.

13. The gaming system of claim 8, wherein the one or more controllers are further configured to assign virtual currency to the player account in response to completion of the third task, the virtual currency being redeemable for enhancements in an online social game.

14. The gaming system of claim 8, wherein the second task must be performed online in one of a casual game or a monetary gambling game.

* * * * *